March 5, 1957 K. E. SIHVONEN 2,783,643
RESONANT PICK-UP DEVICE
Filed Dec. 18, 1953 2 Sheets-Sheet 1
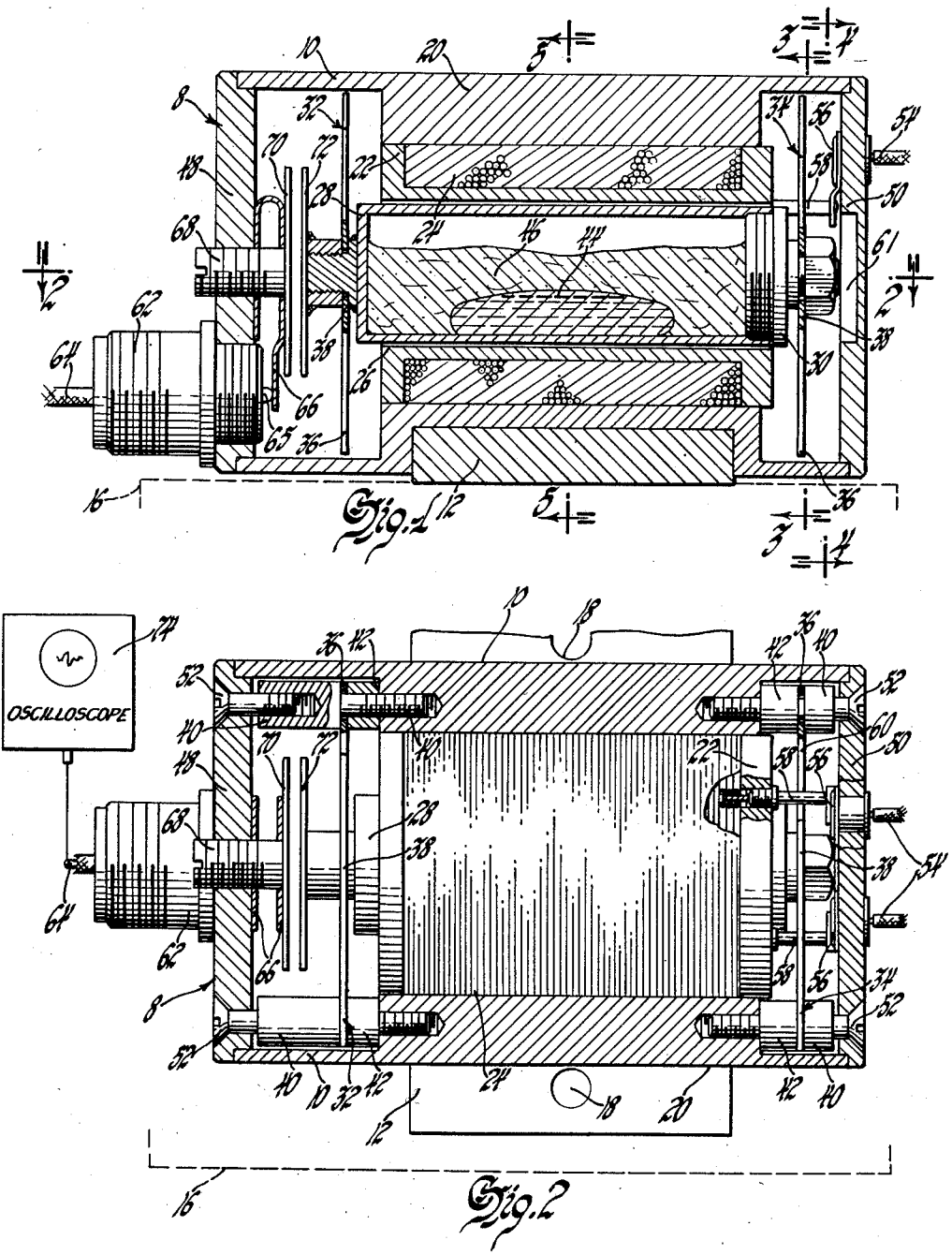
INVENTOR
Kauno E. Sihvonen
BY
ATTORNEY March 5, 1957 K. E. SIHVONEN 2,783,643
RESONANT PICK-UP DEVICE
Filed Dec. 18, 1953 2 Sheets-Sheet 2

INVENTOR
Kauno E. Sihvonen
BY L. D. Burel
ATTORNEY

United States Patent Office 2,783,643
Patented Mar. 5, 1957

2,783,643

RESONANT PICK-UP DEVICE

Kauno E. Sihvonen, Detroit, Mich., assignor to General Motors Corporation, Detroit, Mich., a corporation of Delaware Application December 18, 1953, Serial No. 399,028

7 Claims. (Cl. 73—71)

This invention relates to resonant type vibrational pick-up devices and more particularly to a means for damping such devices to eliminate extraneous disturbances received thereby.

In the testing of rotors, crankshafts, and other rotatable members for balance resonant type pick-up devices are often used to detect vibrational disturbances caused by unbalance in such members. For accurate and precise balancing it is necessary that such pick-up devices be highly sensitive to vibrational disturbances. Resonant pick-up devices employed in precision balancing are generally found to be not only responsive to the vibrational effects within the test piece but also to extraneous disturbances that may be received through the mounting frame of the test piece, from bearing irregularities and other sources.

It is now proposed to provide a means of damping for use with resonant type vibrational pick-up devices which will eliminate or substantially reduce disturbances received from other than the workpiece. The provision for damping includes the association of a magnetic fluid mass and a nonmagnetic fluid mass, disposed within a container, with a spring member having known resonant characteristics and responsive to the workpiece unbalance. The degree of damping imposed upon the spring member is dependent upon the freedom of movement of the fluid masses within the container. When the resonant pick-up device proposed is associated with a workpiece and the rotational speed of the workpiece is set to cause resonance of the spring member the amount of damping imposed upon the spring member may be varied by adjusting the degree of solidification of the magnetically responsive fluid mass. The damping is applied only so far as necessary to eliminate extraneous disturbances and until the major resonant frequency, that of the workpiece, stands substantially alone.

The proposed device includes a magnetic fluid mass and a nonmagnetic fluid mass to provide a greater degree of damping control. Precision balancing requires the greatest sensitivity within the test device. Since the damping of such a device reduces its sensitivity it is important that only so much damping is imposed as is necessary to remove or reduce disturbances adversely affecting a reading of the test piece unbalance. The provision of two relatively movable fluid masses also provides a greater frictional surface for the absorption of kinetic energy. A further absorption of kinetic energy is accomplished by the attempt of the nonmagnetic mass to disrupt the magnetic alignment of the magnetically energized particles forming the magnetic fluid mass.

Figure 1 is a cross section side elevational view of a device embodying the features of this invention.

Figure 2 is a cross section view of the vibrational damping device taken in the plane of line 2—2 of Figure 1 and viewed in the direction of the arrows thereon.

Figure 3:
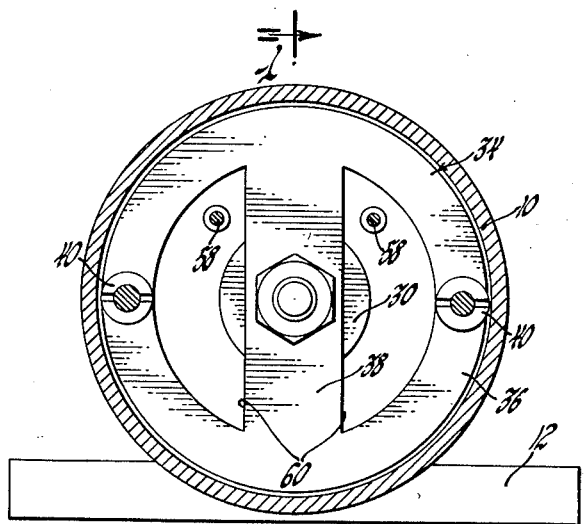
Figure 3 is a cross sectional end view of the proposed device taken in the plane of line 3—3 of Figure 1 and viewed in the direction of the arrows thereon.
Figure 4:
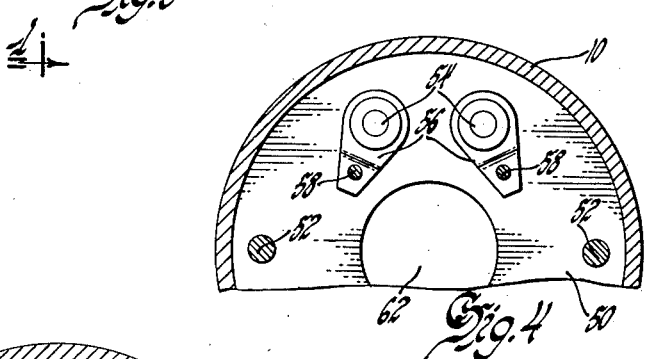
Figure 4 is a cross sectional and fragmentary view of the proposed device taken in the plane of line 4—4 of Figure 1 and viewed in the direction of the arrows thereon.
Figure 5:
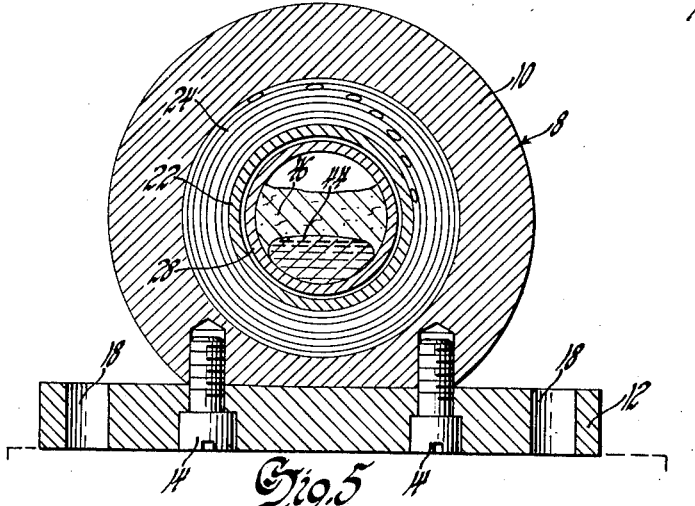
Figure 5 is a cross section view taken substantially centrally through the proposed device in the plane of line 5—5 of Figure 1 and viewed in the direction of the arrows thereon.

A resonant type pick-up 8 embodying the principles of this invention is shown in the drawings and comprises a cylindrical housing 10 secured to the base member 12 as by machine screws 14. The base member is adapted to be secured to a vibrating structure 16 and is provided with apertures 18 for such purpose. The vibrating structure 16 may be a frame member within which is mounted an unbalanced member to be tested.

Formed substantially centrally within the cylindrical housing 10 is a cylindrical sleeve 20. A spool 22 is secured within the sleeve 20 and has a number of turns of electrically conductive wire wound thereon to form a coil 24. A passage 26 is formed axially through the spool 22. Within passage 26 is disposed a cylindrical container 28 closed at one end and having a plug 30 for closing the other end. The container 28 is held centrally within the passage 26 and in spaced relation to the walls of the passage by flexible spring members 32 and 34. The spring members 32 and 34 are thin disk-like angular rings 36 having a center crosspiece 38. The springs 32 and 34 are secured to the cylindrical housing 10 as by fasteners 40 and have the container 28 secured centrally to the spring crosspiece 38. Spacers 42 are placed between the springs 32 and 34 and the housing 10 to position the springs in an unobstructed position and to allow the container 28 greater freedom of axial movement.

Disposed within the container 28 are fluid-like masses 44 and 46. The mass 44 is a cohesive, nonmagnetic and heavy fluid such as mercury. The mass 46 comprises a powdered, granulated, or shot sized mass of magnetic particles which are adapted to form a fluid-like mass encompassing the heavier nonmagnetic mass 44.

The ends of the housing are closed by members 48 and 50 secured in place by fastening means 52 engaged within the spring retaining fasteners 40. Electrical leads 54 are connected to contacts 56 secured to the inner face of the housing closure member 50. Prong contacts 58 are associated with the coil 24 and extend through the open parts 60 of the flexible springs 32 and 34 to engage the contacts 56. Means are thereby provided for energizing the coil 24. The closure member is recessed as at 61 to enable greater oscillatory movement of the container 28.

An electrical socket 62 is threaded within the other closure member 48 and is adapted to receive an electrical lead 64 therein. A terminal 65 of the socket 62 engages a contact spring 66 secured to a set screw 68. Set screw 68 is threaded centrally through the closure member 48 and is adapted to position the contact spring 66 with respect to the socket terminal 65. A condenser plate 70 is secured to the end of set screw 68 and is positioned adjacent and in spaced relation to a condenser plate 72 secured to the end of the container 28. The condenser plate 72 is grounded through the housing 10. An oscilloscope or other indicating means 74 may be secured to the lead 64 to enable reading the relative movement of the condenser plate 72 and consequently the container 28.

When the resonant type pick-up 8 is secured to a vibrating structure 16 the housing 10 of the pick-up is forced to vibrate in unison with the structure. When the vibrational frequency of the structure corresponds to the resonant frequency of the spring members 32 and 34 the container 28 suspended between the springs is caused to oscillate with the springs. The inertia force of the container 28, and of the fluid masses 44 and 46 disposed within the container, resist movement much like a fluid dashpot and absorb a portion of the kinetic energy of the vibrational forces tending to set them in motion. When the kinetic force causing vibrational movement exceeds the inertia force of the container 28 the fluid masses 44 and 46 are caused to move relative to the container. The movement of the fluid masses with respect to the walls of the container 28 and to each other further damps the force causing movement of the container. The relative movement of the condenser plates 70 and 72 gives an indication of the presence of the unbalanced forces acting upon the container 28 at the resonant frequency of the springs 32 and 34 and is readable upon the oscilloscope 74.

When the coil 24 is electrically energized the magnetic particles forming the fluid mass 46 are aligned with respect to the lines of force emanating from the coil and thereby restrain relative movement of the magnetic fluid mass 46, of the nonmagnetic fluid mass 44 and of the container 28. Such solidification of the fluid masses 44 and 46 within the container eliminates the damping effect upon the resonating spring members 32 and 34. In such undamped condition the resonant type pick-up has maximum sensitivity. The resonant type pick-up in the undamped state is sensitive to extraneous disturbances other than the unbalanced forces causing resonance of the spring members. The unbalance characteristic shown on the oscilloscope will be obscured by such disturbances. By adjusting the degree of energization of the coil 24 the vibration of the spring members 32 and 34 may be damped to the extent necessary to eliminate or reduce the extraneous disturbances received by the pick-up device and shown on the oscilloscope 74. The degree of damping is controllable within very small gradations in that the less current applied to the coil 24 the less viscous is the magnetic fluid mass 46 and the more freedom of movement permissible by the nonmagnetic fluid mass 44. Thus two variable factors are provided enabling more controllable damping of the pick-up device to within the limits required to reduce the effects of extraneous disturbances without unduly sacrificing sensitivity within the pick-up device.

I claim:

1. A damping device adapted to be secured to a vibrating structure for absorbing and dissipating vibrational forces, said device comprising a fluid container, resilient mounting means for securing said container to said structure, fluid-like masses disposed within said container, and a coil wound about said container and in spaced relation thereto, one of said fluid-like masses being magnetically responsive to energization of said coil for damping vibration responsive movement of said container.

2. A damping device for absorbing and dissipating vibrational forces, said device being adapted to be secured to a vibrating structure and comprising a fluid container, spring means for mounting said container to said structure, a coil disposed in spaced relation about said container, means for variably energizing said coil, and fluid-like masses disposed within said container, one of said fluid-like masses being magnetically responsive to the energization of said coil for damping vibration responsive movement of said container.

3. A vibration sensing device comprising a housing adapted to be secured to a vibrating structure, a fluid container disposed within said housing and resiliently mounted in spaced relation thereto for relative movement with respect to said housing, an electrically energized coil disposed within said housing and in spaced relation about said container, fluid-like masses disposed within said container, one of said fluid-like masses being magnetically responsive to said energized coil, and means for varying the energization of said coil to alter the extent of attraction of said one fluid-like mass and the damping effect thereof upon the vibration responsive movement of said container.

4. A vibration sensing device comprising a housing adapted to be secured to a vibrating structure, a coil of electrically conductive wire secured within said housing, a fluid container resiliently secured to said housing and centrally disposed in spaced relation within said coil, a fluid-like mass of magnetic material disposed within said container, a fluid-like mass of nonmagnetic material disposed within said container and immersed within said fluid-like mass of magnetic material, and means for variably energizing said coil to establish a magnetic field for attracting and restraining movement of said fluid-like mass of magnetic material and damping the vibration responsive movement of said container.

5. A vibration sensing device comprising a container, resilient mounting means for securing said container to a vibrating structure, a fluid-like mass of magnetic material disposed within said container, a fluid-like mass of nonmagnetic material immersed within said fluid-like mass of magnetic material, means disposed adjacent said container for producing a magnetic field, said field being variable to alter magnetic attraction of said fluid-like mass of magnetic material for damping the vibration responsive movement of said container.

6. A vibration sensing device comprising a fluid dashpot resiliently secured to a vibrating structure, said dashpot being partially filled with a fluid-like mass of magnetic material, a fluid-like mass of nonmagnetic material immersed within said fluid-like mass of magnetic material, magnetic means disposed adjacent said dashpot and adapted to attract said fluid-like mass of magnetic material, said magnetic means being adjustable to vary the attraction for said fluid-like mass of magnetic material for altering the damping characteristics of said dashpot.

7. A vibration sensing device comprising a housing adapted to be secured to a vibrating structure, a container resiliently mounted within said housing for freedom of axial movement, a fluid-like mass of magnetic material disposed within said container, a fluid-like mass of nonmagnetic material immersed within said fluid-like mass of magnetic material, an electrical coil disposed about said container and in spaced relation thereto, a variable condenser provided within said housing and having one plate thereof secured to said housing and the other plate thereof to said container and in close spaced relation to said one plate, indicator means connected to said plates for indicating relative movement of said container within said housing, and a variable source of electrical power connected to said coil for controlling the magnetic field induced about said container by energization of said coil.

References Cited in the file of this patent

UNITED STATES PATENTS

| | | |
|---|---|---|
| 2,667,237 | Rabinow | Jan. 26, 1954 |
| 2,720,819 | Ryan et al. | Oct. 18, 1955 |

FOREIGN PATENTS

| | | |
|---|---|---|
| 236,044 | Switzerland | May 16, 1945 |